United States Patent [19]

Pei

[11] 4,282,857
[45] Aug. 11, 1981

[54] SOLAR ENERGY COLLECTOR ASSEMBLY

[75] Inventor: Yu K. Pei, Toledo, Ohio

[73] Assignee: Owens-Illinois, Inc., Toledo, Ohio

[21] Appl. No.: 127,705

[22] Filed: Mar. 6, 1980

[51] Int. Cl.³ .............................................. F24J 3/02
[52] U.S. Cl. .................................... 126/422; 126/443;
126/448; 126/450; 126/420
[58] Field of Search ............... 126/422, 423, 427, 435,
126/432, 437, 442, 443, 448, 450, 420; 165/172,
168, 175, 170, 76; 137/59-62

[56] References Cited

U.S. PATENT DOCUMENTS

| 980,505 | 1/1911 | Emmet | 126/443 |
|---|---|---|---|
| 3,952,724 | 4/1976 | Pei | 126/443 |
| 4,018,215 | 4/1977 | Pei | 126/443 |
| 4,027,821 | 6/1977 | Hayes | 126/420 |
| 4,048,982 | 9/1977 | Pei | 126/442 |
| 4,120,285 | 10/1978 | Nugent | 126/448 |
| 4,207,866 | 6/1980 | Boyd | 126/420 |
| 4,212,293 | 7/1980 | Nugent | 126/450 |
| 4,232,655 | 11/1980 | Frissora et al. | 126/450 |
| 4,237,862 | 12/1980 | Embree | 126/420 |

Primary Examiner—James C. Yeung
Attorney, Agent, or Firm—John R. Nelson; Myron E. Click; David H. Wilson

[57] ABSTRACT

A solar energy collector assembly is provided which finds particular utility when interconnecting a plurality of tubular solar energy collectors with each other, in parallel, to form a bank of collectors, and when interconnecting a plurality of such banks of collectors with each other, in series, to form a tiered arrangement. The assembly, in combination with other apparatus, provides a capability for a batch and/or a continuous circulation system and provides a capability for quickly filling tubular solar energy collectors with a fluid under pump pressure and for quickly and completely draining tubular solar energy collectors of the fluid under gravity, thereby yielding a failsafe operation regarding freezing conditions and/or boil-out conditions.

9 Claims, 6 Drawing Figures

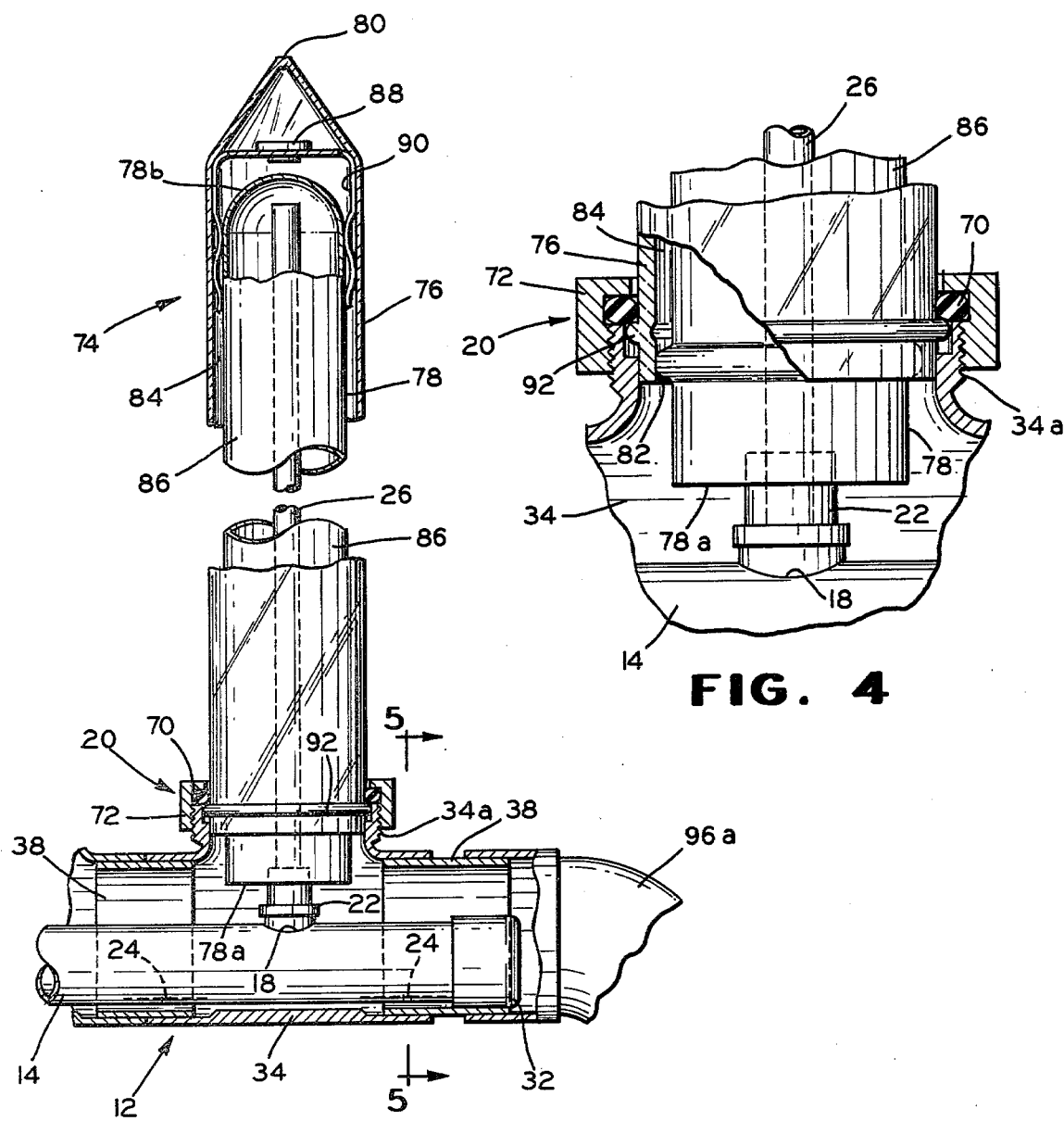

SOLAR ENERGY COLLECTOR ASSEMBLY

BACKGROUND OF THE INVENTION

This invention relates to a manifold assembly for supplying and removing a fluid, upon command, to a plurality of solar energy collectors for heating and/or energy exchange by absorption. More specifically, the invention relates to a manifold assembly which interconnects a plurality of tubular solar energy collectors with each other, in parallel, to form a bank of collectors, and which further interconnects a plurality of banks of collectors with each other, in series to form a tiered arrangement, for the delivery of a heat exchangeable liquid under pressure in one direction, and for the return of the liquid under gravity in the opposite direction, upon command. The manifold assembly, in combination with other apparatus, provides a capability for a batch system operation and/or a continuous system operation. Additionally, the manifold system provides a capability for quickly filling tubular solar energy collectors with a heat exchangeable liquid under pump pressure and for quickly and completely draining the tubular solar energy collectors under gravity, to yield a fail safe operation regarding freezing conditions and/or boil-out conditions. Manifold systems used heretofore, primarily for tubular solar energy collectors, as contrasted to flat plate or panel collectors, have not been concerned with fail safe conditions, economics and simplicity. Rather, the heretofore mentioned manifold systems demonstrated feasibility for use with high performance tubular solar energy collectors. The circulating fluid, preferably water, remained in the manifold and collectors without provision for removal by draining. Thus the apparatus became vulnerable to damage by accidental freezing and boiling, caused by malfunction of the control system and the hydronic system. In addition, little consideration had been given to the loss of thermal energy when a large volume of water stagnated overnight inside the tubes, or to power consumption during continuous cycling of the fluid, or to servicing and maintenance of the system especially with hot water inside the collectors.

There are two basic types of solar energy collectors: (1) flat plate or panel collectors comprising a plate of glass and an energy absorbing surface therebelow and having a fluid circulating therein; and (2) tubular collectors comprising a double-walled configuration with a vacuum between the inner and the outer tube, and with the former having a energy absorbing coating on its outside surface and a fluid on its inside surface to absorb solar heat. The inherent differences between the two types dictate that what may be good for one type is not necessarily operable with the other. However, irrespective of the inherent differences, recent attempts with both types to rectify the above considerations have been met with other problems and/or tradeoffs. For instance, some attempts included the use of an anti-freeze solution to the heat transfer fluid, but the efficiency of the system was reduced due to the lower coefficient of heat transfer of the anti-freeze solution. With the flat plate collectors attempts have been made to batch operate and/or to provide a drainable system to safeguard against freezing and boil-out conditions. Generally, with flat-plate collectors, parallel tubing is employed to carry the fluid and drainability is feasible except that small diameter tubes are used to increase surface area and hence efficiency for heat transfer, and some fluid remains in the tubes due to surface tension. And, when larger diameter tubes are used, less efficiency is realized. Because flat plate collector panels have a low fluid capacity, a batch mode operation approaches a continuous mode operation due to the frequency of the "batching" and hence requires greater power consumption. Additionally, with flat plate collectors, should a malfunction develop or the fluid purposefully be drained during the day cycle, the collectors get very hot, causing damage to the tubing therein.

With the tubular collectors, early systems were capable of tiered arrangements, but operation was limited to a continuous mode, the apparatus was complex and the system was not drainable due in part to the serpentine configuration of the flow of the fluid within a bank or tier of tubular collectors. Recent attempts to provide a batch mode operation with tubular collectors have been met by other problems, including being unable to have a tiered arrangement thus limiting the capacity of the system, and drainability is so slow that power is required to drain the system of each "batch."

The present invention answers the above considerations and overcomes the problems by providing a batch mode operation in a real sense due in part to the large fluid capacity in the tubular collectors, a capability for filling a tiered arrangement of banks of the tubular collectors, a gravity-drain system, and by reducing power consumption.

SUMMARY OF THE INVENTION

The present invention comprises apparatus means and process means to controllably transfer a heat-exchangeable fluid to and from a plurality of specifically arranged tubular solar energy collectors on a batch-mode basis, to safeguard against freeze conditions and boil-out conditions, to reduce power consumption, to reduce thermal losses, and to improve service and maintenance of the apparatus. More specifically, the present invention comprises a manifold system for tubular solar energy collectors, in combination with other apparatus, which manifold system interconnects a plurality of tubular solar energy collectors with each other in parallel, to form a bank or tier of collectors, and which further interconnects a plurality of banks or tiers with each other in series, to form a tiered arrangement, for the delivery of a heat exchangeable fluid under pressure in one direction and for the return of the fluid under gravity in the opposite direction, under sensor command.

BRIEF DESCRIPTION OF THE DRAWINGS

FIG. 3 is a segmented elevation view of a tubular solar energy collector sealably mounted on a portion of a manifold assembly, with sections broken away for clarity;

FIG. 4 is an enlarged partial sectional view of a tubular solar energy collector sealably mounted on a portion of a manifold assembly, showing details of the mounting structure;

FIG. 5 is a sectional view of a portion of a manifold assembly, taken along line 5—5 of FIG. 3; and FIG. 6 is a sectional view of a portion of a manifold assembly taken along line 6—6 of FIG. 2.

DESCRIPTION OF THE PREFERRED EMBODIMENT

The apparatus and method of this invention find particular utility in the drainability of tubular solar energy collectors mounted on a manifold for the circulation of a heat-exchangeable fluid. With tubular collectors, as contrasted to flat plate or panel collectors, larger volumes of fluid are circulated, generally in a serpentine pattern, to yield high performance heat exchange from the sun's energy to the fluid. However, continuous circulation of the fluid becomes uneconomical due to the power consumption required, and due to thermal losses from the circulating fluid in connective piping. Furthermore, stagnation of the fluid overnight due to slow and incomplete draining or during malfunction results in additional thermal losses and concern regarding freeze conditions and boil-out conditions. Thereby, it has become desirable to batch-feed, by pump pressure, the fluid to the collectors until the fluid has become heated and to return the heated water to a holding tank. With such a batch-feed operation, it is important that the tubular collectors and the manifold rapidly and completely drain, by gravity, upon sensor command, to provide a simple, efficient, fail-safe operation. At the same time, the batch-feed operation must be capable of being serviced and maintained at all times, especially when the fluid is heatable during daylight hours. These requirements indicate the necessity for a manifold assembly which will quickly feed a plurality of tubular collectors with a large volume of fluid, hold the fluid in situ until the fluid is heated to a pre-determined temperature, and return the heated fluid to its source, numerous times during daylight hours. Because of the concern over power consumption and energy saving means utilized to reduce the same, it becomes crucial to obtain a true batching operation so that the system is not constantly recycling the fluid, despite the fact that the fluid will be exposed to the sun's energy.

Figure 1:
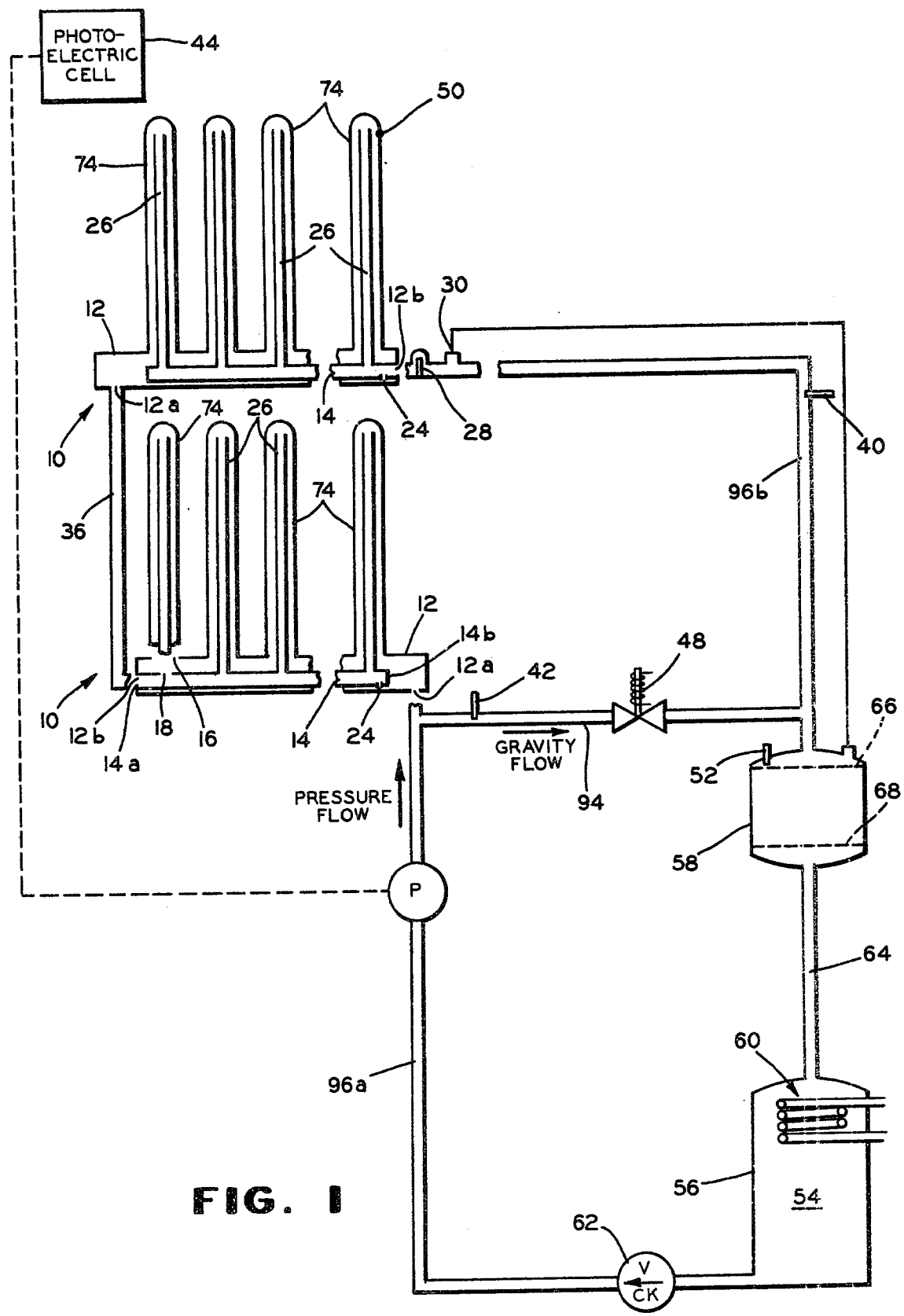
FIG. 1 is a schematic view of a manifold assembly for solar energy collectors and additional apparatus.

Referring to FIG. 1, a manifold assembly 10 is illustrated in combination with additional apparatus to show a preferred embodiment of the invention and to show a preferred operation of a solar energy collector system. The manifold assembly 10 interconnects a plurality of tubular solar energy collectors 74 with each other in parallel, to form a bank or tier of collectors, and further interconnects a plurality of banks or tiers of collectors with each other, in series, to form a tiered arrangement. The manifold assembly 10 comprises a plurality of outer jackets 12, each of which have inlet openings 12a and outlet openings 12b for transfering a heat-exchangeable fluid 54, such as water or other suitable fluid, in one direction under pressure by means of a pump P, and in the opposite direction under gravity. The pump P, may be a conventional centrifugal pump of sufficient horsepower to deliver a specified volume of fluid 54 to a specified height in a specified amount of time. The upper portion of the outer jackets 12 have a plurality of spaced apart holes 16 of a suitable diameter to receive the tubular collectors 74. The outer jackets 12 are spaced apart a suitable distance to accomodate the tubular collectors 74 and to provide a tiered arrangement. Each of the outer jackets 12 are positioned substantially horizontally, but may be inclined slightly to facilitate draining. A plurality of inner jackets 14, one of which is located within each of said outer jackets 12, have one open end 14a and one closed end 14b. The open end 14a is aligned with the outlet opening 12b of the outer jacket 12 to form a union, such as by brazing, soldering, or by threaded means. The inner jackets 14 have a plurality of spaced apart holes 18 on their upper portion, in alignment with the holes 16 on the upper portion of the outer jackets 12. At least one drain hole 24 is provided on the lower portion of each inner jacket 14, which holes are of a size that will not disrupt the flow of fluid under pressure in one direction but that will allow for draining of the inner jackets 14. A plurality of tubular projections 26 or overflow tubes having open ends are seated in the holes 18 on the upper portion of the inner jacket 14, and extend through the holes 16 on the upper portion of the outer jackets 12, to substantially the length of the tubular solar energy collectors 74 when the latter are sealably mounted on the outer jackets 12. Connective tubing 36 provides communcation on between the tiers or banks of collectors by connecting outlet opening 12b in the lowest tier with inlet opening 12a in the next tier. The number of tiers appears to be unlimited, provided the pump pressure is sufficient to pump fluid 54 therethrough. The number of tubular collectors 74 in each tier also appears to be unlimited, as long as a back pressure does not develop to prevent filling the collectors 74 substantially to the same level.

Air trap means 28 located proximal to outlet opening 12b of the outer jacket 12 of the last tier of collectors, is an additional element to the manifold assembly to prevent a siphoning effect on the fluid, hereinafter described in greater detail. Bleeder line 30 is an optional element to the manifold assembly, and for an unpressurized system, a simple air vent (not shown) or plug (not shown) for a pressurized system, may be employed in lieu thereof.

In operation the manifold assembly 10 is utilized with additional apparatus to form a solar energy collection and delivery system, on a batch-mode basis, which materially reduces power consumption requirements and which provides safeguards regarding freeze conditions and boil-out conditions. The system is initiated at daybreak by a photoelectric cell 44, which activates pump P. The pump draws heat-exchangeable fluid from a holding tank 56 through conduit 96a to inlet opening 12a of outer jacket 12 of the first tier of a tiered arrangement. Conduit 96b provides communication between the union of the inner jacket 14 and the outer jacket 12 in the last tier and displacement tank 58 is connected to the holding tank 56 via stand-pipe 64. When the pump is activated, solenoid 48 (or other suitable means positioned in conduit 94 which provides communication between conduits 96a and 96b), is in a closed position. Fluid enters through inlet opening 12a into outer jacket 12 of the first tier. The fluid fills outer jacket 12 and enters each of the collectors 74, in parallel, that is, the fluid fills collectors 74 substantially simultaneously until a level is reached where the fluid overflows into overflow tubes 26 which provide communication to inner jacket 14. The fluid advances through the union of the jackets to connective tubing 36 which communicates with outer jacket 12 via inlet opening 12a in the immediate next upper tier of collectors.

This process of filling each tier of collectors, continues, in series, that is, the fluid fills each tier of collectors sequentially, until the last tier in the tiered arrangement is filled. As fluid exits outlet opening 12b of the outer jacket 12 of the last tier of collectors and enters conduit 96b, a flow sensor 40 located in conduit 96b senses the flow and deactivates pump P. As the fluid advances through the manifold assembly 10 and collectors 74, it pushes air ahead to the displacement tank 58. When the pump is deactivated, a check valve 62 prevents backward flow of fluid 54 into holding tank 56. In a closed system, such as shown, the displaced air has a tendency to travel back upwardly in the direction from which it was displaced. To prevent this, the air trap means 28 proximal to outlet opening 12b of outer jacket 12 in the upper tier of collectors prevents air from entering the above mentioned outlet opening 12b, thus averting a siphoning effect which would drain the fluid from the last tier of collectors to the displacement tank 58 prior to heating and by an avenue not desired in the system. The air trap means 28 blocks air flow at a height higher than the upper portion of the inner jacket 14 in the last tier of collectors, as best seen in FIG. 6. The air trap means 28 may be an internal partition as shown, or simply an inverted "U" tubing (not shown). When a bleeder line 30 or air vent (not shown) is employed, a single unit combining air trap means 28 and bleeder line 30 or air vent may be used.

The volume of fluid is heated by the sun's energy until a predetermined temperature measured by temperature sensor 50 is reached. Temperature sensor 50 is preferably located at or near the top of any one or more of the collectors 74 in the last tier of collectors. The temperature sensor 50 may be set at any temperature less than boiling conditions (212° F. at sea level) for unpressurized systems mostly employed for domestic applications and at temperatures of about 250° F. for pressurized systems for commercial applications. Additionally, the temperature sensor 50 or thermister, may provide a high temperature limit, for example about 300° F., to shut the entire power system down. This is a safeguard to prevent pumping of cold fluid into collectors at high temperatures which may cause the collectors to stress-fracture. Such high temperatures are possible when the fluid has been drained from the collectors 74 either through malfunction or by design for servicing or maintenance of the system. A temperature differential may be established between the collectors 74 in the last tier and the holding tank 56. However, a temperature differential system is not as accurate as a system using a single sensor 50.

When the predetermined temperature is reached, the solenoid valve 48 is activated to open to allow the heated fluid to drain into the displacement tank 58, by gravity, via conduit 94. Bleeder line 30 open to the atmosphere in an unpressurized system or in communication with the displacement tank 58e in a pressurized system, facilitates draining of the fluid by reducing the surface tension of the fluid, which may otherwise retard or prevent draining. Alternatively, the conduit 96b can be of a sufficient diameter to guard against formation of high surface tension and thereby eliminate the need for bleeder line 30. Draining of fluid begins from the inlet opening 12a of the outer jacket 12 in the first tier of collectors. The volume of fluid last to enter the manifold assembly 10 is the first to drain therefrom, so that during draining the last tier is first voided of fluid followed by the next tier and so forth until the first tier is voided. Sensor 42, when it senses a lack of fluid flow, reactivates pump P and closes solenoid valve 48 to begin another cycle in the batch-mode operation. The heated fluid in the displacement tank 58 drains to the top of the holding tank 56 to form an upper stratum of heated fluid. In a closed system, heat exchanger 60, located within holding tank 56 in the region of the stratum of heated fluid, enables transfer of energy (heat) to a conventional water heater (not shown) to which the heat exchanger 60 is connected. In an open system, holding tank 56 may be a conventional water heater, thus eliminating the need for heat exchanger 60, and enabling a user to directly draw heated fluid from the holding tank for consumption. Such a system as the latter, without a heat exchanger, requires replenishment of the fluid supply, thereby introducing additional quantities of corrosive agents including oxygen and salts, to the system. Pressure indicator or sensor 52 located on the upper region of displacement tank 58 is a safeguard against boil-out conditions to relieve the pressure of the system. Pressure indicator or sensor 52 may be a pop out plug or may shut down the power for the system.

On a bright sunny day the number of fill-drain cycles may be as high as twelve or fourteen, and on an extremely cloudy day only one cycle may be completed. At any rate, the horsepower requirements are low, since the manifold assembly 10 and the collectors quickly fill and rapidly drain, upon command, thus keeping power consumption low. Furthermore, by employing displacement tank 58 in close proximity to just below the lowest tier, especially in very tall buildings, a high water level is provided. This high water level which holds a volume of water substantially equal to that which is pumped, helps reduce pump horsepower requirements by pushing against water in the holding tank 56 during pumping. For short buildings, the displacement tank 58 may however, be optional. In effect, this invention provides a highly efficient system, since the heat-exchanged energy obtained from the sun's energy is not substantially wasted by power consumption to operate the system.

When nightfall approaches, photoelectric cell 44 shuts down the power supply and/or the pump P and opens solenoid valve 48 to drain the system until the following day. Drain holes 24 on the lower side of the inner jackets 14 allow for total draining of the fluid from the overflow tubes 26 and the inner jackets to safeguard against freeze conditions.

Displacement tank 58 shows the level of fluid when the collectors 74 are drained at 66, and the level of the fluid when the collectors 74 are filled at 68, thereby indicating that only a portion of the fluid in the entire system is being heated during a particular cycle. The displacement tank 58 helps to reduce the head pressure of the fluid by locating tank 58 just below the level of the first tier of collectors, thus reducing horsepower requirements to fill the collectors 74. The tank 58 has a volume capacity greater than the fluid in the manifold assembly 10 and collectors 74 and connecting pipe 36 and conduits 96a, 96b and 94, to allow for expansion of the fluid upon heating.

A continuous mode of operation may also be utilized with the manifold assembly 10 of this invention, although the batch-mode of operation above-described is preferred. With a continuous mode of operation, many of the benefits obtained in the batch-mode of operation are not realized. However, flexibility is provided to the user to make a choice of operation initially or after installation. If the choice is made initially to use a continuous mode, such apparatus including sensors 40 and 42, check valve 62, solenoid 48 and conduit 94 are omitted from the system represented in FIG. 1. However, at a later date, the user may include the omitted apparatus and convert to a batch-mode operation. Conversely, if the user installs a batch-mode operation and desires to convert to a continuous mode of operation, the above apparatus may be deactivated or removed from the system.

Figure 2:
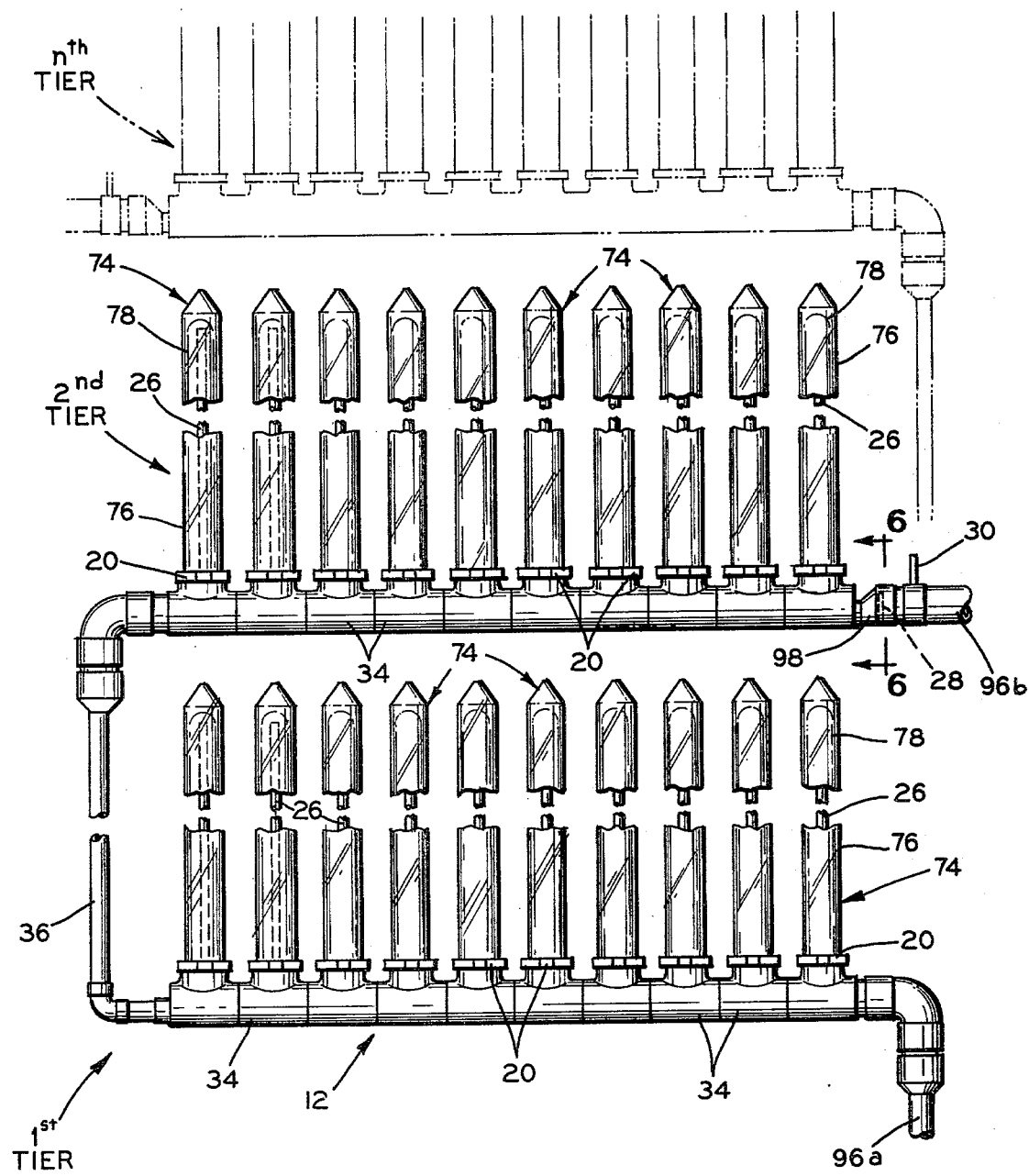
FIG. 2 is a plan view of the manifold assembly with tubular solar energy collectors, in a tiered arrangement.

A more detailed showing of manifold assemblies 10 and the collectors 74, which are removeably attached to the outer jackets 12, is made in FIGS. 2-4. Segmented outer jackets 34 with a threaded upper neck portion 34a are joined by suitable means, such as by brazing or by couplings 38 to form the elongate outer jacket 12. Open receptacles 20 are defened by the neck portion 34a for receiving and sealably mounting the tubular collectors 74 thereon. The receptacles 20 comprise a threaded collar 72, and an O-ring 70 seated in the upper interior of the collar 72 to provide sealing means about the lower end of the tubular collectors 74. A first tier and a second tier of mounted tubular collectors 74 is indicated in FIG. 2, with connecting tubing 36 providing communication there between. Conduit 96a communicates with outer jacket 12 via inlet opening 12a in the first tier and conduit 96b communicates with outer jacket 12 via outlet opening 12b in the second tier. The number of tiers is not a limitation of this invention, thereby an nth tier, in phantom lines, is shown for clarity.

The tubular collectors 74 employed with manifold assembly 10 are preferably constructed of glass. An outer cover tube 76 and an inner absorber tube 78 having a closed end 78b and an open end 78a. Cover tube 76 extends beyond the closed end 78b of the absorber tube 78 and is closed at the tip 80. The absorber tube 78 is provided with a coating 86 of a material which selectively absorbs solar energy directly from the sun's rays. An annular space 84 is provided between the cover tube 76 and the absorber tube 78, and the tubes 76, 78 are joined proximal to the open end 78a of the absorber tube 78 to provide a hermetic seal 82. The annular space 84 is evacuated or reduced to sub-atmospheric pressure to reduce conduction and convection losses of energy (heat) from the collector. Spring support 90 or clip engages the closed end 78b of the absorber tube 78 to help stabilize the upper end of the absorber tube 78. A barium getter 88 mounted on the spring support 90 may be included for removal of traces of gas from the evacuated annular space 84.

A flange 92 circumferentially extends about the cover tube 76 in proximity to the hermatic seal 82 which provides means for O-ring 70 to sealingly engage the tubular collector 74 when compressed by the collar 72 about the threaded neck portion 34a of the segmented outer jacket 34. These details are best seen in FIG. 4.

In assembling the manifold assembly 10, the inner jacket 14 with end cap 32 on one end is positioned within the outer jacket 12 comprising a plurality of segmented outer jackets 34. The inner jacket 14 is positioned with drain holes 24 on the lower side and spaced apart holes 18 on the upper side. A grommet 22 or other suitable means is seated within each of said spaced apart holes 18 for engagement with overflow tube 26. Subsequent to placement of the overflow tubes 26 within the grommets 22, the tubular collectors 74 are positioned in the receptacles 20, whereupon the threaded collar 72 is turned to compress O-ring 70 against the flange 92 and the cover tube 76 of the tubular collector 74.

End cap 32 serves a dual function by closing one end 14b of the inner jacket 14 and by supporting the inner jacket 14 in a raised position to keep drain holes 24 from being too close to the inner wall of the outer jacket 12, thus preventing impedence of fluid flow during draining. A hinged flap (not shown) may be used in place of the end cap 32, to facilitate draining, whereby as fluid 54 is pumped into outer jacket 12, the hinged flap is in a closed position, but in an open position upon draining. End cap 32 and drain hole 24 of inner jacket 14 are most clearly shown in FIG. 3 and FIG. 5 wherein the outside diameter of the end cap 32 is sufficiently large and is resting on the bottom inside surface of the outer jacket 12. More specifically, in the embodiment shown, end cap 32 rests on the bottom inside surface of coupling 38 within a segmented outer jacket 34.

Referring to FIG. 2 and to FIG. 6, one embodiment of air trap means 28 is shown to help clarify the relationship of air passage 100 with respect to the inner jacket 14. The air trap means 28 is shown as a partition snugly seated within expansion fitting 98 and having its upper surface above the upper portion of the inner jacket 14. Thus air which may travel laterally or upwardly is trapped or prevented from entering the inner jacket 14. When the solar energy collector assembly is in operation, during pumping of fluid into the assembly, air is forced ahead of the fluid and enters the conduit 96b. When the pump P is deactivated by flow sensor 40, the displaced air will tend to return to the highest level in the system, the upper ends of the collectors 74, where it is not wanted. Air trap means 28 prevents and acts as a barrier to air returning through the inner jacket 14 which in turn cause fluid to stay in the upper ends of the collectors 74 where it is heated by the sun. Without air trap means 28, the last tier would at least partially void itself of fluid thus decreasing the efficiency of the system. This also protects these glass collectors 74 against the possibility of thermal shock upon refilling, since those collectors 74 will selectively get to much higher temperatures than collectors with fluid therein.

The manifold assembly 10 of the present invention is preferably employed in a tiered arrangement as shown to use large volumes of fluid in each fill-drain cycle. However, for small capacity requirements, a single tier of tubular collectors 74 may be employed with a manifold assembly 10 wherein the collectors 74 fill substantially simultaneously as in a tiered arrangement. The number of collectors 74 may be increased to produce a long tier, but the proper filling of the increased number of tubes could require increased horsepower requirements of the pump, P. With long tiers of collectors 74, a back pressure can develop and long fill times and long drain times can be encountered.

The design of the system as described and claimed hereinafter as important in reducing the time for filling and draining. Generally, the total time required for draining and refilling of the collectors 74 is desired to be less than about ten minutes and is preferred to be less than about five minutes. This is especially important for tiered arrangements which have a high volume of fluid wherein the last fluid in is the first to be voided, thus total time without fluid in the top tier is the total of drain time and refill time. On sunny clear days, an empty tubular collector 74 can reach temperatures above 300° F. after about ten minutes. Although the collectors can withstand temperatures of about 700°-800° F., cold fluid can cause stress-fracture of the collectors having temperatures much above 300° F.

A simplified outer jacket 12 may be constructed from suitable piping of desired length, by providing holes 16 in the upper portion thereof for receipt of receptacles 20 or other suitable means (not shown) for sealably mounting collectors 74. The inner jacket 14 may be constructed of suitable piping with holes 18 in the upper portion thereof, with at least one drain hole 24 in its lower portion, and with one closed end 14b. The piping may be metal, such as copper, especially with pressurized systems, or may be plastic, such as polyvinyl chloride, especially with non pressurized systems.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. In a solar energy collector apparatus, a manifold assembly interconnecting a plurality of tubular solar energy collectors with each other, in parallel, to form a bank of collectors, said manifold assembly further interconnecting a plurality of banks of collectors with each other, in series, to form a tiered arrangement, said manifold assembly comprising:
   (a) a plurality of enclosed outer jackets, each jacket having inlet and outlet openings for transfering a fluid therethrough in one direction under pressure and in an opposite direction under gravity, said outer jackets having a plurality of spaced apart holes of a suitable diameter to receive said tubular collectors on the upper portion of said outer jackets, and said outer jackets being positioned substantially horizontally and spaced to provide said tiered arrangement;
   (b) a plurality of receptacles positioned about said spaced apart holes on said upper portion of said outer jackets, for sealably mounting each of said tubular collectors;
   (c) a plurality of inner jackets, one of which is located within each of said outer jackets, said inner jackets having a plurality of spaced apart holes on its upper portion and in alignment with said holes in said outer jackets, said inner jackets having at least one drain hole on its lower portion, and said inner jacket having one enclosed end and one open end, wherein said open end is sealably fixed to said outlet opening in said outer jacket to form a union;
   (d) a plurality of grommets seated in each of said holes on said upper portion of said inner jackets;
   (e) a plurality of upwardly extending tubular projections having one open end seated within said grommets, passing through said receptacles and extending substantially the length of said collectors with the other open end adjacent the closed end of said collector when said collectors are sealably mounted on said receptacles;
   (f) a plurality of connective tubing, each of which has one end connected to said union and has the other end connected to an inlet opening in another of said outer jackets, so that said banks of collectors are in open communication; and
   (g) air trap means proximal to said outlet opening of said last outer jacket in said tiered arrangement, to prevent a siphoning effect when said pressure is removed, so that said fluid remains intact in said manifold assembly until released upon command;
whereby as fluid is introduced under pressure into one of said openings in the first outer jacket in said tiered arrangement, said fluid is accommodated for circulation under pressure in one direction through said tubular collectors, in parallel, and through said banks of collectors in series, and said fluid is further accommodated for draining, under gravity, in a reverse direction, upon said command.

2. The solar energy collector apparatus as claimed in claim 1, wherein said drain holes on said lower portions of said inner jackets are of sufficient size to fully drain, under gravity, said fluid from said tubular projections and said inner jackets, but are of insufficient size to disrupt flow of said fluid within said inner jackets, under pressure.

3. The solar energy collector apparatus as claimed in claim 1, wherein said air trap means comprises an external inverted U-shaped tubing having its lower surface higher than the top surface of said inner jacket.

4. The solar energy collector apparatus as claimed in claim 1, wherein said air trap means comprises an internal disc-shaped partition with an upper cut-out portion, said cut-out portion being higher than the top surface of said inner jacket.

5. The solar energy collector apparatus as claimed in claim 1, further including an air vent in said larger connective tubing distal to said outlet opening of said outer jacket in said last tier, to reduce surface tension of water in said larger connective tubing upon draining of said fluid from said manifold assembly.

6. The solar energy collector apparatus as claimed in claim 1, wherein said outer jackets of said manifold assembly are slightly inclined from the horizontal to facilitate substantially complete draining of said fluid.

7. The solar energy collector apparatus as claimed in claim 1, wherein said one enclosed end of said inner jacket is an end cap means having an outside diameter sufficiently large to rest on the bottom inside surface of said outer jacket, to prevent said drain holes in said inner jacket from being obstructed.

8. The solar energy collector apparatus as claimed in claim 1, wherein said one enclosed end of said inner jacket is an end-cap means hingeably attached to said enclosed end so that said fluid under pressure closes said end-cap and said fluid under gravity opens said end-cap.

9. In a solar energy collector system, comprising: (a) water tank for a fluid supply; (b) heat exchanger; (c) tubular solar energy collectors; (d) manifold means to transfer a fluid to and from said collectors; (e) temperature sensors to regulate when said transfer occurs during operation; (f) photo-electric cell to initiate and to terminate said transfer of said fluid; (g) valve means to check fluid flow (h) pump means to move said fluid (i) connecting tubing to provide a circuit for said fluid; the improvement, comprising a manifold assembly which provides a batch mode operation during daylight hours to reduce power consumption and which provides shut-down during night-time hours with quick and complete drainability, under gravity, for a fail safe operation regarding freezing conditions and boil-out conditions, said manifold assembly interconnecting a plurality of tubular solar energy collectors with each other, in parallel, to form a bank of collectors, and further interconnecting a plurality of banks of collectors with each other, in series, to form a tiered arrangement, said manifold assembly comprising:
   (a) a plurality of enclosed outer jackets, each jacket having inlet and outlet openings for transfering a fluid therethrough in one direction under pressure and in an opposite direction under gravity, said outer jackets having a plurality of spaced apart holes of a suitable diameter to receive said tubular collectors on the upper portion of said outer jackets, and said outer jackets being positioned substantially horizontally and spaced to provide said tiered arrangement;

(b) a plurality of receptacles positioned about said spaced apart holes on said upper portion of said outer jackets, for sealably mounting each of said tubular collectors;

(c) a plurality of inner jackets, one of which is located within each of said outer jackets, said inner jackets having a plurality of spaced apart holes on its upper portion and in alignment with said holes in said outer jackets, said inner jackets having at least one drain hole on its lower portion, and said inner jacket having one enclosed end and one open end, wherein said open end is sealably fixed to said outlet opening in said outer jacket to form a union;

(d) a plurality of grommets seated in each of said holes on said upper portion of said inner jackets;

(e) a plurality of upwardly extending tubular projections having one open end seated within said grommets, passing through said receptacles and extending substantially the length of said collectors with the other open end adjacent the closed end of said collector when said collectors are sealably mounted on said receptacles;

(f) a plurality of connective tubing, each of which has one end connected to said union and has the other end connected to an inlet opening in another of said outer jackets, so that said banks of collectors are in open communication; and (g) air trap means proximal to said outlet opening of said last outer jacket in said tiered arrangement, to prevent a siphoning effect when said pressure is removed, so that said fluid remains intact in said manifold assembly until released upon command;

whereby said fluid can be introduced under pressure into one of said openings in the first outer jacket in said tiered a arrangement, to substantially simultaneously fill all of said tubular collectors mounted on said first outer jacket, until said fluid overflows into said tubular projections to enter said inner jacket of said first outer jacket, for delivery to said additional tiers of collectors, sequentially, and whereby, upon command, said fluid can be released, under gravity, or flow in a reverse direction.

* * * * *